(12) United States Patent
Xu et al.

(10) Patent No.: US 9,282,278 B2
(45) Date of Patent: Mar. 8, 2016

(54) METHOD, MULTIMEDIA SYSTEM AND NETWORK SIDE DEVICE FOR RECORDING PROGRAM

(75) Inventors: Quan Xu, Shenzhen (CN); Yinlong Wang, Shenzhen (CN); Qin Xiong, Shenzhen (CN); Dechao Wang, Shenzhen (CN); Zhongcheng Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1030 days.

(21) Appl. No.: 13/395,882

(22) PCT Filed: Jun. 22, 2010

(86) PCT No.: PCT/CN2010/074232
§ 371 (c)(1),
(2), (4) Date: Mar. 13, 2012

(87) PCT Pub. No.: WO2011/029331
PCT Pub. Date: Mar. 17, 2011

(65) Prior Publication Data
US 2012/0174175 A1    Jul. 5, 2012

(30) Foreign Application Priority Data

Sep. 14, 2009    (CN) .......................... 2009 1 0173600

(51) Int. Cl.
*H04N 21/231* (2011.01)
*H04N 21/462* (2011.01)
(Continued)

(52) U.S. Cl.
CPC .............. *H04N 5/782* (2013.01); *H04L 67/104* (2013.01); *H04N 21/23103* (2013.01);
(Continued)

(58) Field of Classification Search
CPC .......... H04N 21/442; H04N 21/23103; H04N 21/4622; H04N 21/4334; H04N 21/2747; H04N 21/23116; H04L 67/04
See application file for complete search history.

(56) References Cited

U.S. PATENT DOCUMENTS

2007/0118857 A1    5/2007    Chen et al.
2008/0034259 A1 *  2/2008    Ko et al. ....................... 714/718
(Continued)

FOREIGN PATENT DOCUMENTS

| CN | 101179702 A | 5/2008 |
| CN | 101489103 A | 7/2009 |
| CN | 101656861 A | 2/2010 |

OTHER PUBLICATIONS

International Search Report for PCT/CN2010/074232 dated Sep. 19, 2010.

*Primary Examiner* — Benjamin R Bruckart
*Assistant Examiner* — Jason Thomas
(74) *Attorney, Agent, or Firm* — Ling Wu; Stephen Yang; Ling and Yang Intellectual Property

(57) ABSTRACT

The present invention provides a method for recording programs, a multimedia system and a network side device. The multimedia system includes a network side device and a plurality of nodes, wherein the network side device is configured to generate a recording task after receiving a recording request, and send in advance the recording task to each node in which a channel specified in the recording task is stored, and the nodes are configured to record a program on the channel specified in the recording task after receiving the recording task, and return recording result information to the network side device. According to the recording method of the present invention, when the recording is failed, inter-node mutual reconstruction and complementary recording can be performed, which greatly decreases the possibility of failure in the recording of the program, and provides the quality of service of more fluent TVOD for users.

9 Claims, 5 Drawing Sheets

(51) Int. Cl.

| | |
|---|---|
| *H04N 21/433* | (2011.01) |
| *H04N 21/442* | (2011.01) |
| *H04N 21/2747* | (2011.01) |
| *H04L 29/08* | (2006.01) |
| *H04N 5/782* | (2006.01) |
| *H04N 21/6332* | (2011.01) |
| *H04N 21/6543* | (2011.01) |

(52) U.S. Cl.
CPC .... *H04N 21/23116* (2013.01); *H04N 21/2747* (2013.01); *H04N 21/4334* (2013.01); *H04N 21/442* (2013.01); *H04N 21/4622* (2013.01); *H04N 21/6332* (2013.01); *H04N 21/6543* (2013.01)

(56) References Cited

U.S. PATENT DOCUMENTS

2008/0046954 A1* 2/2008 Bhogal et al. ................. 725/134
2008/0282312 A1* 11/2008 Blinnikka .................... 725/153
2009/0010610 A1* 1/2009 Scholl et al. ................... 386/68

* cited by examiner

METHOD, MULTIMEDIA SYSTEM AND NETWORK SIDE DEVICE FOR RECORDING PROGRAM

TECHNICAL FIELD

The present invention relates to the field of multimedia services, such as Internet Protocol Television (IPTV), mobile TV, mobile streaming media, etc., and in particular, to a method for recording a program, a multimedia system and a network side device in which very high success rate is required to record programs of video and voice in a multi-node deployment network.

BACKGROUND OF THE RELATED ART

IPTV services are wideband value-added services which provide an interactive TV experience and multimedia service for users by connecting a set top box (STB) to a wideband network and using a computer or a TV set as a display terminal. An IPTV system can provide Video on Demand (VOD), Live TV, Time-shifted TV (TSTV) and TV on Demand (TVOD). The IPTV system is a multi-node architecture. In order to equalize concurrent streams generated when users watch TV, logical nodes are set to manage conceptually areas and are responsible for services in the areas, and master and backup agent servers, magnetic arrays, several blades able to provide service functions are configured under the nodes. Pathways are established in a central node in the IPTV system, and are then relayed to other edge nodes.

Live TV, also called as live service, is one of the basic service forms for IPTV services. Live TV is realized based on live channels. For users, like conventional channel TV, channel switch and channel selection, the live TV is realized in the form of screen menu, which enriches television channels watched by the users. For operators, the live TV is an efficient means for attracting conventional TV users, and its operation key lies in channel features. From the perspective of technical realization, the live TV generally transmits TV program information over IP networks using the Internet Protocol (IP) multicast technique.

TSTV is in a media playing mode in which users can be liberated from conventional program schedules such that the users can perform operations such as pause and backward of live TV programs while watching the programs and fast forward to the moment when the current live TV is played, which subverts the original way of watching TV and brings viewers completely new television experience.

TVOD, which is an extension of the TSTV, makes a segment of program on the live channel into a recorded program for displaying in an electronic program list such that users can demand missed wonderful programs ad libitum and choose programs a few days ago. Thus the IPTV becomes real "my TV", gets rid of constraint of time, and complies with faster and faster life rhythm of modern people.

The success rate of recording a program (for example, TVOD) is currently high, but failure also exists. For carrier-class operation requirements, failure of recording a program is unacceptable except the problem of channel itself or improper production of the recorded program itself. Excluding serious faults, such as power down, manually stopping of a server of an IPTV system or streaming media blade services, or no signal on a channel, in normal operation of the IPTV system, programs are required to be ensure recorded successfully as much as possible in the following conditions without affecting services: switching between master and backup servers in a short time or network failure in a short time occurs in some of nodes due to too high drop out code rate of the channel.

SUMMARY OF THE PRESENT INVENTION

The technical problem to be solved by the present invention is to provide a method for recording a program with a very high success rate, a multimedia system and a network side device such that in the case of failure of the recording, inter-node mutual reconstruction and complementary recording of the program can be performed, thereby decreasing greatly the possibility of failure in recording the program, and providing users with the quality of service of more fluent TVOD.

In order to solve the above technical problem, the present invention provides a method for recording a program, applied to a multimedia system of a multi-node architecture comprising a network side device, the method comprising:

the network side device generating a recording task after receiving a recording request, and sending in advance the recording task to each node in which a channel specified in the recording task is stored; and the node recording a program on the channel specified in the recording task after receiving the recording task, and returning recording result information to the network side device.

The method further comprises:

when the node records the program, the network side device checking periodically the recording result information returned from each node, and checking whether there is a node in which time shift configuration for temporary storage of programs is set for the channel if the recording result information is found to be recording failure information, and if yes, sending an complementary recording task to the node in which the time shift configuration for temporary storage of the programs is set for the channel; and after receiving the complementary recording task, the node in which the time shift configuration for temporary storage of the programs is set for the channel determining whether a time period of the program which is recorded unsuccessfully is within a time range of the programs temporarily stored by the time shift configuration in the node, if yes, extracting a program having the same time period as the time period of the program which is recorded unsuccessfully from the programs temporarily stored in the node as its recorded program, and then returning recording success information to the network side device.

The method further comprises:

when the node records the program, the network side device checking periodically the recording result information returned from each node, and sending a scheduling task to a node in which the recording of the program is failed if the recording result information is found to be recording failure information; and after receiving the scheduling task, the node in which the recording of the program is failed as a destination node scheduling a program from a node in which the recording of the program is successful as a source node as its recorded program, and returning recording success information to the network side device.

The multimedia system is a multilevel node architecture comprising a first level node, second level nodes and third level nodes, the first level node is connected to a plurality of second level nodes, and each second level node is connected to a plurality of third level nodes.

The step of the network side device sending the scheduling task to the node in which the recording of the program is failed if the recording result information is found to be the recording failure information comprises:

the network side device firstly determining whether the program is recorded successfully in the first level node in the recording task;

if the program is not recorded successfully in the first level node, selecting a second level node in which the recording of the program is successful as a source node to generate a scheduling task to schedule programs from the first level node, and send the scheduling task to the first level node; if the program is not recorded successfully in the second level node, selecting a third level node in which the recording of the program is successful as a source node to generate a scheduling task to schedule programs from the first level node, and sending the scheduling task to the first level node;

if the program is recorded successfully in the first level node, further determining whether the program is recorded successfully in a second level node in the recording task; if not, selecting the first level node as a source node to generate a scheduling task to schedule programs from the second level node, and sending the scheduling task to the second level node; and if the program is recorded successfully in the second level node in the recording task, determining whether the program is recorded successfully in a third level node in the recording task; if not, selecting a second level node connected to the third level node as a source node to generate a scheduling task to schedule programs from the third level node, and sending the scheduling task to the third level node.

After the destination node receives the scheduling task, the method further comprises:

determining whether a program which is the same as a program to be scheduled specified in the scheduling task is stored in the node and whether size error of the programs is within an allowable range, and if yes, returning scheduling success information to the network side device.

After each node receives the recording task, the method further comprises:

the node inserting the received recording task after a recording task in a local recording task queue whose starting time of a time period is earlier than starting time of a time period of the received recording task and has a minimum time interval from the starting time of the time period of the received recording task.

The present invention further provides a multimedia system comprising a network side device and a plurality of nodes, wherein the network side device is configured to generate a recording task after receiving a recording request, and send in advance the recording task to each node in which a channel specified in the recording task is stored; and the nodes are configured to record a program on the channel specified in the recording task after receiving the recording task, and return recording result information to the network side device.

The network side device is further configured to, when each node records the program, check periodically the recording result information returned from the node, and check whether there is a node in which time shift configuration for temporary storage of programs is set for the channel if the recording result information is found to be recording failure information, and if yes, send an complementary recording task to the node in which the time shift configuration for temporary storage of the programs is set for the channel.

The node in which the time shift configuration for temporary storage of the programs is set for the channel is further configured to, after receiving the complementary recording task, determine whether a time period of the program which is recorded unsuccessfully is within a time range of the programs temporarily stored by the time shift configuration in the node, if yes, extract a program having the same time period as the time period of the program which is recorded unsuccessfully from the programs temporarily stored in the node as its recorded program, and then return recording success information to the network side device.

The network side device is further configured to, when the node records the program, check periodically the recording result information returned from each node, and send a scheduling task to a node in which the recording of the program is failed if the recording result information is found to be recording failure information.

The node in which the recording of the program is failed is further configured to, after receiving the scheduling task, schedule a program from a node in which the recording of the program is successful as its recorded program, and return recording success information to the network side device.

The multimedia system is a multilevel node architecture comprising a first level node, second level nodes and third level nodes, the first level node is connected to a plurality of second level nodes, and each second level node is connected to a plurality of third level nodes.

The network side device is configured to, if the recording result information is found to be the recording failure information, send the scheduling task to the node in which the recording of the program is failed by:

firstly determining whether the program is recorded successfully in the first level node in the recording task;

if the program is not recorded successfully in the first level node, selecting a second level node in which the recording of the program is successful as a source node to generate a scheduling task to schedule programs from the first level node, and send the scheduling task to the first level node; if the program is not recorded successfully in the second level node, selecting a third level node in which the recording of the program is successful as a source node to generate a scheduling task to schedule programs from the first level node, and sending the scheduling task to the first level node;

if the program is recorded successfully in the first level node, further determining whether the program is recorded successfully in a second level node in the recording task; if not, selecting the first level node as a source node to generate a scheduling task to schedule programs from the second level node, and sending the scheduling task to the second level node; and if the program is recorded successfully in the second level node in the recording task, determining whether the program is recorded successfully in a third level node in the recording task; if not, selecting a second level node connected to the third level node as a source node to generate a scheduling task to schedule programs from the third level node, and sending the scheduling task to the third level node.

The network side device is a content management engine, and each node comprises a media control unit and a plurality of streaming servers controlled by the media control unit.

The media control unit is configured to send the recording task to the streaming servers storing the channel specified in the recording task after receiving the recording task sent by the content management engine, and send the recording result information sent from the streaming servers to the content management engine after receiving the recording result information.

The streaming servers storing the channel specified in the recording task are configured to record the program on the channel specified in the recording task after receiving the recording task, and return the recording result information to the media control unit.

The media control unit is further configured to send the recording task to a streaming server with a minimum load if there are more than two controlled streaming servers storing the channel specified in the recording task.

The present invention further provides a network side device configured to generate a recording task after receiving a recording request, send in advance the recording task to each node in which a channel specified in the recording task is stored, and receive recording result information returned to the network side device after the node records a program on the channel specified in the recording task after receiving the recording task.

The network side device is further configured to, when each node records the program, check periodically the recording result information returned from the node, and check whether there is a node in which time shift configuration for temporary storage of programs is set for the channel if the recording result information is found to be recording failure information, and if yes, send an complementary recording task to the node in which the time shift configuration for temporary storage of the programs is set for the channel, and receiving recording success information returned to the node in which the time shift configuration for temporary storage of the programs is set for the channel.

After receiving the complementary recording task, the node in which the time shift configuration for temporary storage of the programs is set for the channel determines whether a time period of the program which is recorded unsuccessfully is within a time range of the programs temporarily stored by the time shift configuration in the node, if yes, extract a program having the same time period as the time period of the program which is recorded unsuccessfully from the programs temporarily stored in the node as its recorded program, and then return recording success information to the network side device.

The network side device is further configured to, when the node records the program, check periodically the recording result information returned from each node, and send a scheduling task to a node in which the recording of the program is failed if the recording result information is found to be recording failure information, and receive scheduling success information returned by the node in which the recording of the program is failed.

The scheduling success information returned to the network side device after the node in which the recording of the program is failed receives the scheduling task to schedule a program from a node in which the recording of the program is successful as its recorded program.

The network side device is applied to a multimedia system, the multimedia system is a multilevel node architecture comprising a first level node, second level nodes and third level nodes, the first level node is connected to a plurality of second level nodes, and each second level node is connected to a plurality of third level nodes.

The network side device is configured to, if the recording result information is found to be the recording failure information, send the scheduling task to the node in which the recording of the program is failed by:

firstly determining whether the program is recorded successfully in the first level node in the recording task;

if the program is not recorded successfully in the first level node, selecting a second level node in which the recording of the program is successful as a source node to generate a scheduling task to schedule programs from the first level node, and send the scheduling task to the first level node; if the program is not recorded successfully in the second level node, selecting a third level node in which the recording of the program is successful as a source node to generate a scheduling task to schedule programs from the first level node, and sending the scheduling task to the first level node;

if the program is recorded successfully in the first level node, further determining whether the program is recorded successfully in a second level node in the recording task; if not, selecting the first level node as a source node to generate a scheduling task to schedule programs from the second level node, and sending the scheduling task to the second level node; and if the program is recorded successfully in the second level node in the recording task, determining whether the program is recorded successfully in a third level node in the recording task; if not, selecting a second level node connected to the third level node as a source node to generate a scheduling task to schedule programs from the third level node, and sending the scheduling task to the third level node.

The network side device is a content management engine.

In conclusion, the present invention provides a method for recording a program, a multimedia system and a network side device. In the recording method according to an embodiment of the present invention, the recording of the program may be failed in some of the nodes for a certain reason, while the recording of the program is successful in the other nodes so as to realize inter-node automatic mutual reconstruction of the recorded program. Before and after the process in which a core module—the content management engine—of the IPTV system performs switching between master and backup servers or a server of the content management engine is restarted or upgraded in half an hour and then is started to operate, the current task of recording TVOD is almost not influenced and reaches a very high success rate of recording. After the process in which a media control unit of each node of the IPTV system performs switching between master and backup servers or the server of the media control unit is restarted or upgraded in a long time and is started to operate, a streaming server to which the media control unit belongs can be prevented from losing the TVOD significantly. The IPTV system usually has a plurality of streaming servers under control of the media control unit, including a streaming server responsible for coding and decoding of channels. If the streaming server responsible for coding and decoding of the channels does not work, although other streaming servers can be switched to, the switching causes directly the TVOD not to be recorded during the switching. However, the method for recording the program according to the present invention can ensure that the TVOD also exists in other streaming servers under the control of the media control unit, and thus services demanded by users will not be influenced. In addition, when the record of the TVOD is failed or missed in the IPTV system, the recording of the TVOD may be completed complementarily in an allowable range of the length of time shift of the channel, which is flexible and convenient and greatly improves the performance service of the IPTV system.

PREFERRED EMBODIMENTS OF THE INVENTION

The technical scheme of the present invention will be described below in more detail in conjunction with the accompanying drawings and embodiments.

Figure 1:
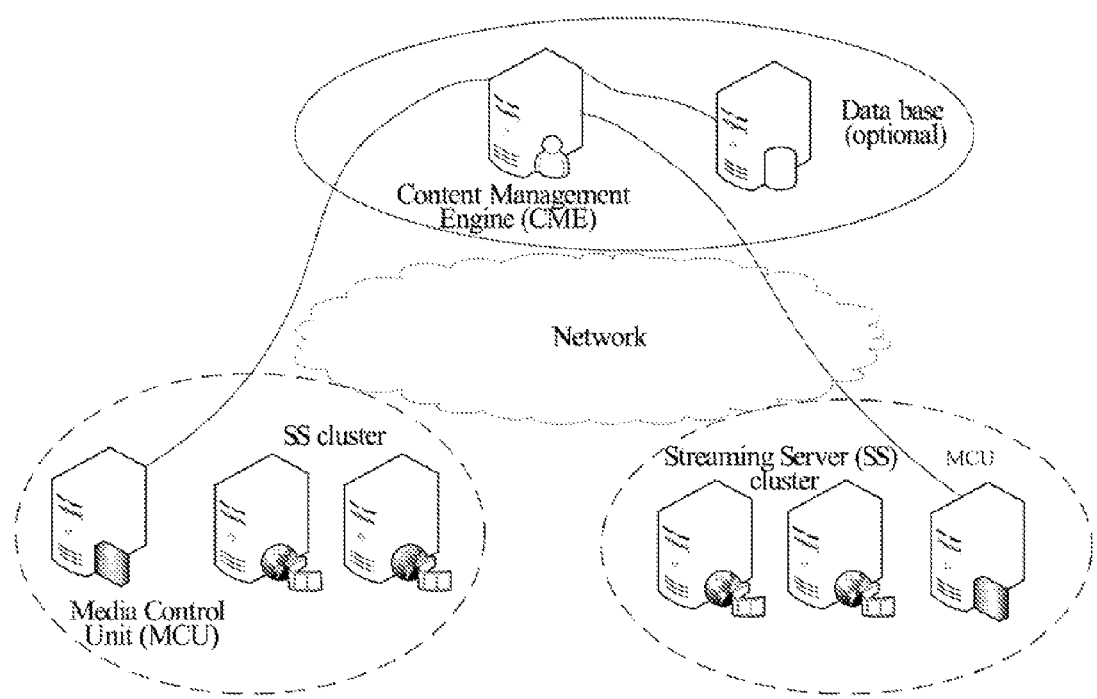
FIG. 1 is a schematic diagram of a multimedia system according to an embodiment of the present invention.

FIG. 1 is a schematic diagram of a multimedia system according to an embodiment of the present invention. The multimedia system according to the embodiment may be an IPTV system, a mobile TV system or mobile streaming media. As shown in FIG. 1, the multimedia system according to the embodiment comprises a network side device and a plurality of nodes. The network side device in the embodiment may be a Content Management Engine (CME), and each node comprises a Media Control Unit (MCU) and a plurality of Streaming Servers (SSs). One content management engine may manage a plurality of media control units, and one media control unit may control a plurality of streaming servers.

The media control unit selected by the content management engine when sending a recording request satisfies first a condition that a streaming server controlled by the media control unit stores a channel of a program to be recorded, and the media control unit can be further selected according to a load balance strategy. For example, presently under a media control unit, one channel is served on only one streaming server, or one channel may be considered to be served on a plurality of (more than two) streaming servers, each of which reporting periodically its performance status, such as CPU usage, concurrent streams demanded by users. Then according to the performance status, a streaming server with the highest remaining service ability value is obtained by a weighing method, that is, a streaming server with a minimum load is selected to complete services demanded by the channel to process the recording task. Similarly, when the media control unit sends the recording task, it selects a streaming server storing the channel of the program to be recorded, and the streaming server can further be selected according to the load balance strategy.

In view of decreasing as much as possible the influence of restart of a server of the content management engine or a server of the media control unit in a short time or of switching between master and backup servers on the recording task, the content management engine sends the recording task to the media control units of the nodes a certain time (for example, one day) in advance in an order of time at which the recording task starts.

The media control unit sends the recording task to the streaming server storing the channel to be recorded specified in the recording task. The streaming server is responsible for coding and decoding of the channels, and recording the program in real time. The streaming server records the program on the channel specified in the recording task after receiving the recording task, and then returns recording result information to the media control unit, which then returns the recording result information to the content management engine. The successfully recorded program is stored under a directory corresponding to the recorded program in a separate file. When the recording of the program is failed in some of the nodes, the program is reconstructed mutually between the nodes; when the recording of the program is failed in all of the nodes, complementary recording of the programs is tried again.

The content management engine checks periodically the recording result information returned from each node when the program is recorded in the node. If some of the nodes are found to return the recording failure information, the content management engine sends a scheduling task to a media control unit of a node in which the recording of the program is failed. After receiving the scheduling task, the media control unit of the node in which the recording of the program is failed schedules a successfully recorded program from a media control unit of a node in which the recording of the program is successful as its recorded program, and returns scheduling success information to the content management engine.

In addition, the content management engine checks periodically the recording result information returned from each node when the program is recorded in the node. If all of the nodes are found to return the recording failure information, it is indicated that significant project failure such as network interruption or cutoff of media streams of the channel most probably occurs, and the system should give an alert such that operators can know and resolve such a situation in time. Next, the content management engine checks whether there is a node in which time shift configuration for temporary storage of the program is set for the channel to be recorded, if not, the recorded program can not be reconstructed and is directly determined to be failure; if yes, an complementary recording task is sent to a media control unit of the node in which the time shift configuration for temporary storage of the program is set for the channel needing to be recorded. After receiving the complementary recording task, the media control unit of the node sends the complementary recording task to a streaming server in which time shift configuration for temporary storage of the program is set for the channel to be recorded, and then the streaming server determines whether a time period of the program which is recorded unsuccessfully is within a time range of programs temporarily stored by the time shift configuration, if yes, a program with the same time period as the time period of the program which is recorded unsuccessfully is extracted from the programs temporarily stored in the streaming server as the recorded program, and then complementary recording success information is returned to the media control unit, otherwise, complementary recording failure information is returned to the media control unit.

Any device in the multimedia system in accordance with the embodiment is independent, i.e. failure in one device will not influence other devices. Moreover, the multimedia system according to the embodiment is a multi-node architecture, and when a program fails to be recorded in one node, it may be recorded successfully in other nodes. When there are more than three nodes, the possibility of recording of one program being failed in all the nodes is far lower than one ten-thousandth, thus increasing greatly the success rate of recording the program.

A method for recording a program according to the present invention will be described below in detail by taking an IPTV system as an example.

The IPTV system comprises a network side device, such as a content management engine, and a plurality of nodes, each of which comprising a media control unit and a plurality of streaming servers. The IPTV system is a multilevel node architecture. In the embodiment, after receiving a recording request, the content management engine of the IPTV system generates a recording task for TVOD and sends the recording task to each media control unit in advance, and then the media control units of the IPTV system send the recording task to the streaming servers to record the TVOD. The content management engine checks periodically the TVOD which fails to be recorded, and performs inter-node mutual reconstruction according to a certain strategy if the recording of the TVOD is successful in some of the nodes and the recording of the TVOD is failed in the other nodes; if the recording of the TVOD is failed in all of the nodes, the complementary recording is performed on each node.

Figure 2:
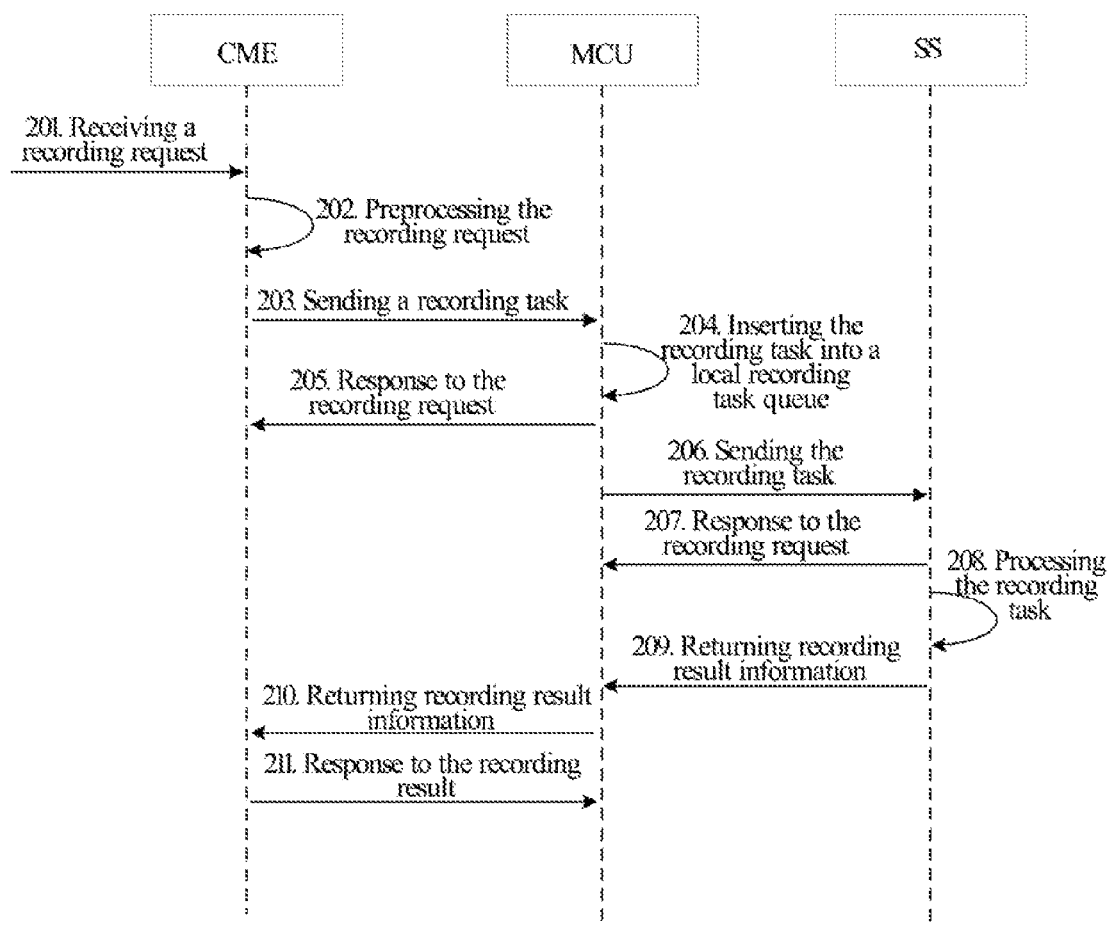
FIG. 2 is a flowchart of a method for recording a program according to an embodiment of the present invention.

FIG. 2 is a flowchart of a method for recording a program according to an embodiment of the present invention. As shown in FIG. 2, the method for recording the program according to the embodiment comprises the following steps.

In step 201, a content management engine receives a recording request.

The recording request may be sent to the content management engine from an external system, such as IPTV service management system or user set top box (STB), etc. The recording request should contain information of programs to be recorded, for example, the recording request sent from the IPTV service management system contains a time schedule of programs to be recorded. In the embodiment, the time schedule of programs is represented by starting time and ending time, but there is no limitation to the representation mode of such information in the present invention.

The recording request may also contain information for deleting the recording task. After receiving such a recording request, the content management engine deletes the recording task if the recording task is still in the local recording task queue and notifies the media control unit, which deletes the recording task if the recording task is still in its local recording task queue after receiving the notification.

The recording request may also contain information for modifying the recording task. After receiving such a recording request, the content management engine modifies the recording task if the recording task is still in the local recording task queue and notifies the media control unit, which modifies the recording task if the recording task is still in its local recording task queue after receiving the notification.

In step 202, the content management engine preprocesses the recording request, transforms the qualified recording request into a recording task, and then adds the recording task to a recording task table of the content management engine.

The recording task contains information, such as TVOD identity (ID), time shift channel ID, TVOD starting time, TVOD ending time and TVOD name. After determining that the recording request is qualified, the content management engine may return to a sending party of the recording request a response indicating that the recording request has been accepted.

Determining that the recording request is qualified may comprise checking a channel in the recording request and a time period of the TVOD. The content management engine determines whether the channel of the TVOD to be recorded has been configured in the streaming server. The recording starting time must be a few minutes in advance, and recording duration is usually within 4 hours.

In step 203, the content management engine sends the recording task to the media control unit.

One content management engine may manage a plurality of media control units, and one media control unit may control a plurality of streaming servers. A media control unit selected by the content management engine when sending the recording request satisfies first a condition that the channel of the TVOD to be recorded is stored in a streaming server controlled by the media control unit, and the media control unit can be further selected according to a load balance strategy. Similarly, a streaming server selected by the media control unit when sending the recording task should store the channel of the TVOD to be recorded, and the streaming server can be further selected according to the load balance strategy.

In view of decreasing as much as possible the influence of restart of a server of the content management engine or a server of the media control unit in a short time or of switching between master and backup servers on the recording task, the content management engine sends the recording task to a master server of the media control unit a certain time (for example, one day) in advance in an order of time at which the recording task starts. Normally, only the master server of the media control unit provides service. When failures occur in the content management engine, the media control unit may send the received recording task to the streaming server as usual, thus, the streaming server may record the TVOD normally according to the recording task; when failures occur in the master server of the media control unit, other server of the media control unit are quickly switched to act as a master server, and meanwhile the task of recording the TVOD is synchronized to the recording task queue stored in the node.

In step 204, the media control unit maintains the recording task queue of the node, inserts the recording task into the recording task queue of the node, and updates a task index table of the recording task queue of the node.

In the embodiment, when the recording task is inserted, the recording task is inserted after a recording task whose starting time of a time period is earlier than starting time of a time period of the recording task and which has a minimum time interval from the starting time of the time period of the recording task such that recording tasks in the local recording task queue are arranged sequentially in an order of starting time of the TVOD to facilitate selection of a recording task early than the current time. The media control unit updates the task index table whenever a new recording task is inserted so as to maintain the status of the local recording task.

In step 205, the media control unit returns a response to the recording request to the content management engine after the recording task is inserted into the local recording task queue successfully.

In step 206, the media control unit extracts periodically the recording task with starting time being about to arrive (for example, about 2 seconds in advance) from the local recording task queue to send to the streaming server.

In step 207, the streaming server returns the response to the recording request to the media control unit immediately upon receiving the recording task.

In step 208, the streaming server processes the received recording task, determines whether the streaming server has stored the channel of the TVOD to be recorded, and whether recording starting time and ending time are correct (i.e. both the recording starting time and ending time should be later than the current time), and if yes, records the program in real time; otherwise, returns directly recording failure information to the media control unit.

In step 209, the streaming server sends to the media control unit recording result information, and reports the recording result, wherein the recording result information contains recording success information or recording failure information (including error information).

In step 210, after receiving the recording result information, the media control unit sends to the content management engine the recording result information, and reports periodically the execution result of the recording task until a acknowledge response of the content management engine is received.

In step 211, if the recording result information received by the content management engine is the recording success information, the recording task is marked as a success status, and then a piece of record (including full path information of the accessible files when the TVOD is demanded) is stored in a TVOD table of a data base, and then a response to the recording result is sent to the media control unit to confirm that the recording result information has been successfully processed.

If the recording result information received by the content management engine is the recording failure information, the recording task is marked as a failure status, or if the recording result information has not been received from the media control unit over a certain time period (for example, 5 minutes) after the recording ending time of the recording task, the recording task is marked as a failure status by the content management engine.

Serious failure of the IPTV system, such as longtime power down of the content management engine or failure of media streams input to channels of the IPTV system, allows failure of recording the TVOD. In addition, in normal operation of the IPTV system, success of services of recording a program is required to be ensured as much as possible in the case that the content management engine is allowed to be restarted or upgraded in a short time (for example, half an hour) and the media control units or streaming servers are upgraded in sequence. In order to further ensure the success of recording of the TVOD, after step 211, the content management engine checks periodically the recording result information sent by the media control unit, and performs inter-node mutual reconstruction according to a certain strategy if the recording of the TVOD is successful in some of the nodes and the recording of the TVOD is failed in the other nodes; if the recording of the TVOD is failed in all the nodes, complementary recording is performed on each node.

Figure 4:
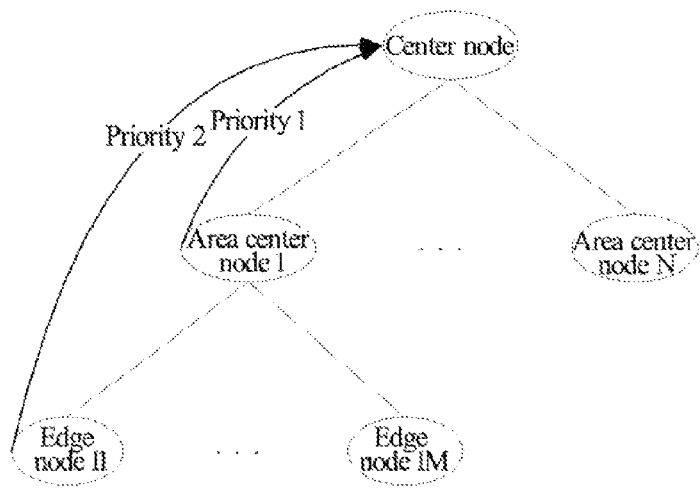
FIG. 4 is a schematic diagram of performing scheduling and reconstruction of TVOD in a center node of an IPTV system according to an embodiment of the present invention.
Figure 5:
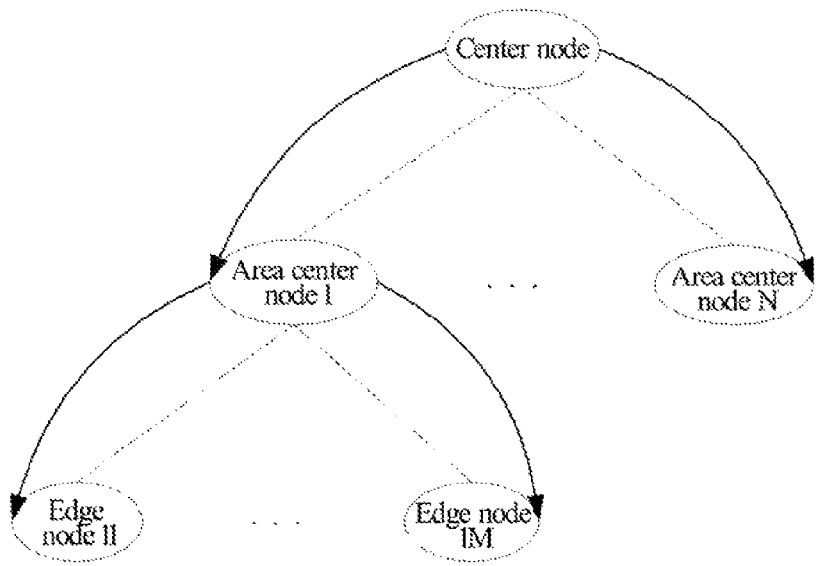
FIG. 5 is a schematic diagram of performing scheduling and reconstruction of TVOD in edge nodes of an IPTV system according to an embodiment of the present invention.

The content management engine checks periodically (for example, every 2 minutes) and processes the recording task that the recording of the TVOD is failed in the IPTV system. The IPTV system in the embodiment is described by taking a three level node architecture system as an example. The IPTV system may be extended to a multilevel node architecture system. For ease of description, the first level node is represented as a center node, second level nodes are represented as area center nodes, and third level nodes are represented as edge nodes. Firstly, the content management engine determines whether the TVOD is successfully recorded in the center node, if not, schedules the TVOD from other nodes to the center node, and the priority order of scheduling is shown in FIG. 4; if the recording task is successful in the center node, and the recording task of the other nodes is failed, the TVOD is scheduled hierarchically to these nodes and the order of the scheduling procedure is as shown in FIG. 5.

After step 210, the content management engine checks periodically whether there is the TVOD in the center node, if yes, the content management engine may return a recording response to a sending party of the recording request, and report the execution result (success) of the recording task; if there is no TVOD in the center node all the while until the recording task is overtime (for example, 2 hours), the content management engine may return a recording response to the sending party of the recording request, and report the execution result (failure) of the recording task. The determination whether there is the TVOD in the center node is made, in order to maintain the consistence of TVOD data in the IPTV system. All contents must be sent to the center node to ensure programs that can be demanded by users can be accessed normally. For example, when a user under an edge node demands a program, if the program is not hit in the node to which the user belongs, the program can be redirected to other nodes (at least there is the program in the center node) to ensure services.

Figure 3:
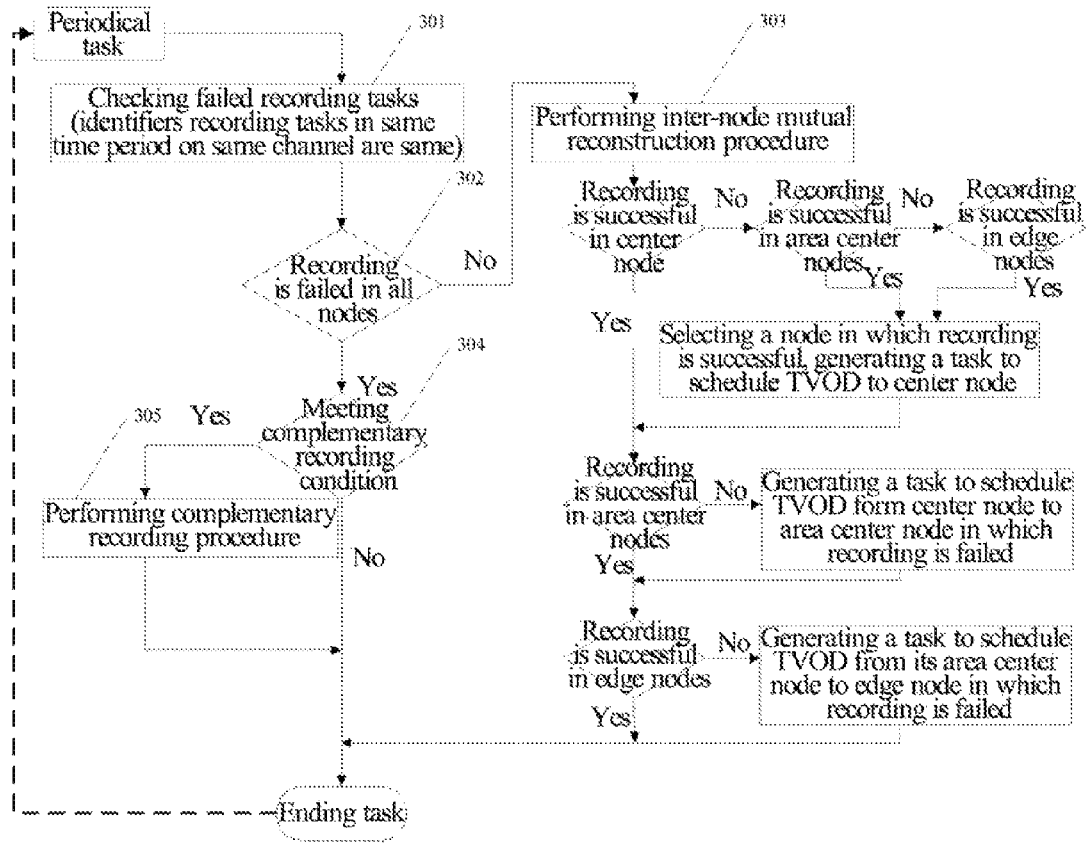
FIG. 3 is a flowchart of a method for reconstructing program which is not recorded successfully according to an embodiment of the present invention.

FIG. 3 is a flowchart of a method for reconstructing a program which is recorded unsuccessfully according to an embodiment of the present invention. As shown in FIG. 3, a basic work procedure of the method for reconstructing a program which is recorded unsuccessfully in each period comprises the following steps.

In step 301, a content management engine detects a recording task that the recording of the TVOD is fails in the IPTV system, wherein identifiers of recording tasks in the same time period on the same channel are the same.

In step 302, the failed TVOD recording task is determined to find whether the recording of the TVOD is failed in all nodes; if the recording is failed in some of the nodes, and the recording is successful in the other nodes, then the step 303 is performed; if the recording is failed in all the nodes, the step 304 is performed.

In step 303, an inter-node mutual reconstruction procedure is performed.

The inter-node mutual reconstruction procedure in the embodiment will be described below.

The content management engine firstly determines whether the recording of the TVOD is successfully in the center node in the recording task, if not, area center nodes in which the recording of the TVOD is successful are preferentially selected. If the recording is failed in the area center nodes, edge nodes in which the recording of the TVOD is successful are selected to generate a task to schedule the TVOD to the center node, and then reconstruction of the recording is performed.

Then, it is determined whether the recording of the TVOD is successful in the area center nodes in the recording task, if not, a task is generated to schedule the TVOD from the center node to the area center nodes and then reconstruction of the recording is performed.

Finally, it is determined whether the recording of the TVOD is successful in the edge nodes in the recording task, if not, a task is generated to schedule the TVOD from the area center nodes to which the edge nodes belong, and then reconstruction of the recording is performed.

In step 304, at this point the recording of the TVOD is failed in all the nodes, it is checked whether the TVOD meets a complementary recording condition, and if yes, the step 305 is performed, otherwise, the TVOD is not processed.

The complementary recording condition is that time shift configuration has been set for the channel of the TVOD in the streaming server, and the configured time shift content contains the TVOD in a time period in which the TVOD is not recorded.

In step 305, a complementary recording procedure is performed.

The relation of scheduling from one node A to another node B is called as a scheduling task of the TVOD in the embodiment. Node A is called as a source node, and node B is called as a destination node. Scheduling ways may be File Transfer Protocol (FTP), HyperText Transfer Protocol (HTTP) or Real Time Streaming Protocol (RTSP), etc. FTP download is taken as an example of the scheduling ways in the embodiment. When the content management engine needs the scheduling of the TVOD, FTP download information, which includes IP address, port number, user name and password, of a streaming server of the source node is firstly selected, and then is used as a scheduling task in combination with TVOD information of the source node, including TVOD identifier, file name and full path of the TVOD. Thereafter, the content management engine processes these scheduling tasks periodically, and identifies the original recording task as a success status after the TVOD has been scheduled in the destination node.

Figure 6:
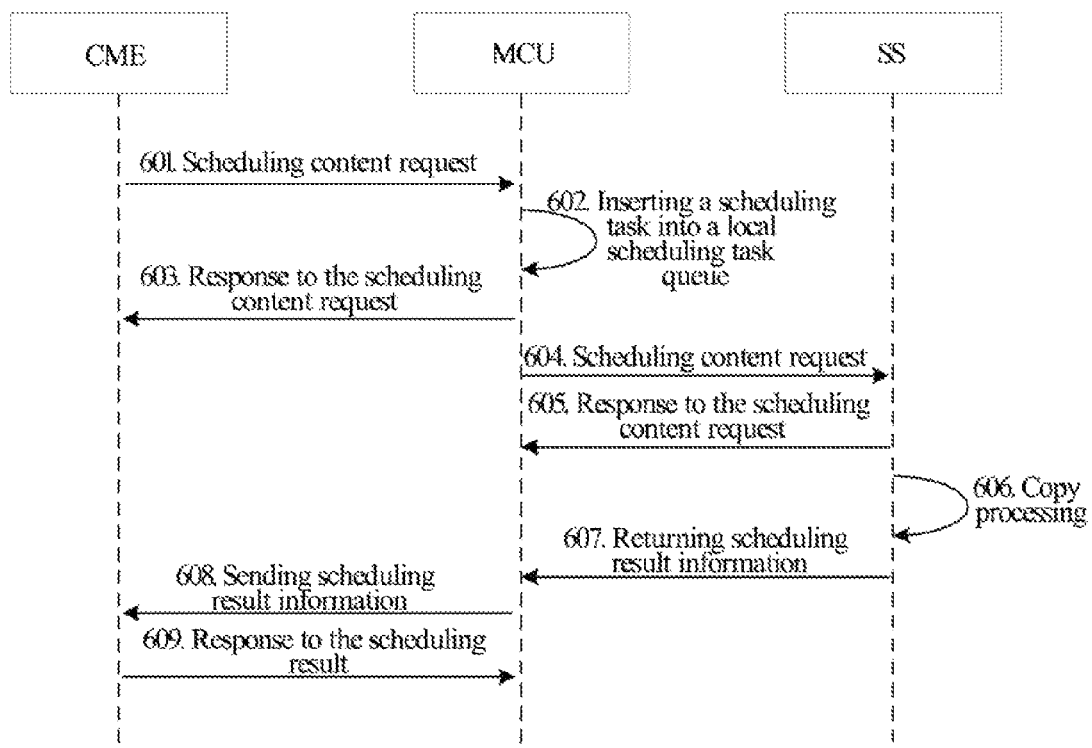
FIG. 6 is a flowchart of a procedure of performing mutual reconstruction of TVOD in an IPTV system according to an embodiment of the present invention.

A basic work procedure in which the content management engine processes periodically scheduling tasks in the embodiment is shown in FIG. 6 and comprises the following steps.

In step 601, a content management engine sends a scheduling content request of TVOD to a media control unit, while sending a scheduling task to the media control unit.

In step 602, the media control unit maintains a local scheduling task queue and inserts the scheduling task into the local scheduling task queue.

In step 603, after receiving the scheduling request, the media control unit returns a response to the scheduling content request to the content management engine.

In step 604, the media control unit selects N (for example, 10) scheduling tasks from the scheduling task queue in each period, and sends the scheduling content request to a streaming server of an IPTV system.

In step 605, when receiving the scheduling request of the TVOD, the streaming server returns a response to the scheduling content request to the media control unit.

In step 606, after receiving the scheduling request of the TVOD, the streaming server processes copies of the actual TVOD. Firstly, the streaming server determines whether a TVOD file exists under the original TVOD directory, if it exists and the size error between the TVOD file and a TVOD to be recorded is within an allowable range (for example, 2%), it is determined that the TVOD file has already existed, and the scheduling result information of success may be directly returned; otherwise, the TVOD file is firstly removed, and then the TVOD is scheduled from a streaming server of the source node to a streaming server of the destination node.

In step 607, after performing the scheduling task of the TVOD, the streaming server sends scheduling result information to the media control unit to return the execution result of the scheduling task.

In step 608, after receiving the scheduling result information, the media control unit sends the scheduling result information to the content management engine to report the execution result of the scheduling task.

In above steps 607 and 608, the execution result may be that the scheduling is successful or the scheduling is failed. If the scheduling is successful, the execution result contains file path information and identifier information (for example, file name) of the TVOD file, and may also contain other attribute information of the TVOD file, such as size, name, etc.

In step 609, if the scheduling result information received by the content management engine is scheduling success information, the content management engine sends a response to the scheduling content result to the media control unit to confirm that the scheduling result message has been successfully processed, and then the content management engine marks the recording task of the TVOD corresponding to the scheduling task as a success status.

If the scheduling result information received by the content management engine is scheduling failure information, the content management engine marks the recording task of the TVOD corresponding to the scheduling task as a failure status.

Thereafter, the content management engine checks periodically the failed task of recording the TVOD, and determines whether to perform a TVOD mutual reconstruction method.

If the TVOD is not recorded successfully in all the nodes, it is very possible that the content management engine can not send recording tasks to the media control units of each node successfully due to its restarting or upgrading at a certain moment. At this point, the content management engine initiates complementary recording processing. The premise of the complementary recording is that time shift configuration is required to be set for channels to be recorded in the streaming server, and the configured time shift content contains the TVOD in a time period in which the TVOD is not recorded. The TVOD is duplicated from the time shift content, which is called as complementary recording.

When the recording of the TVOD is failed in all the nodes, the content management engine determines in which nodes time shift channels have been configured, and sends a complementary recording task to the nodes in which time shift channels have been configured. The recording task of these nodes is marked as a complementary recording status, and the recording task of the other nodes is directly marked as complementary recording failure. When the complementary recording is successful, the original recording task is marked as a success status, and if not in all nodes record the recording of the TVOD is successful, an intra-node mutual reconstruction procedure for the TVOD is performed.

Figure 7:
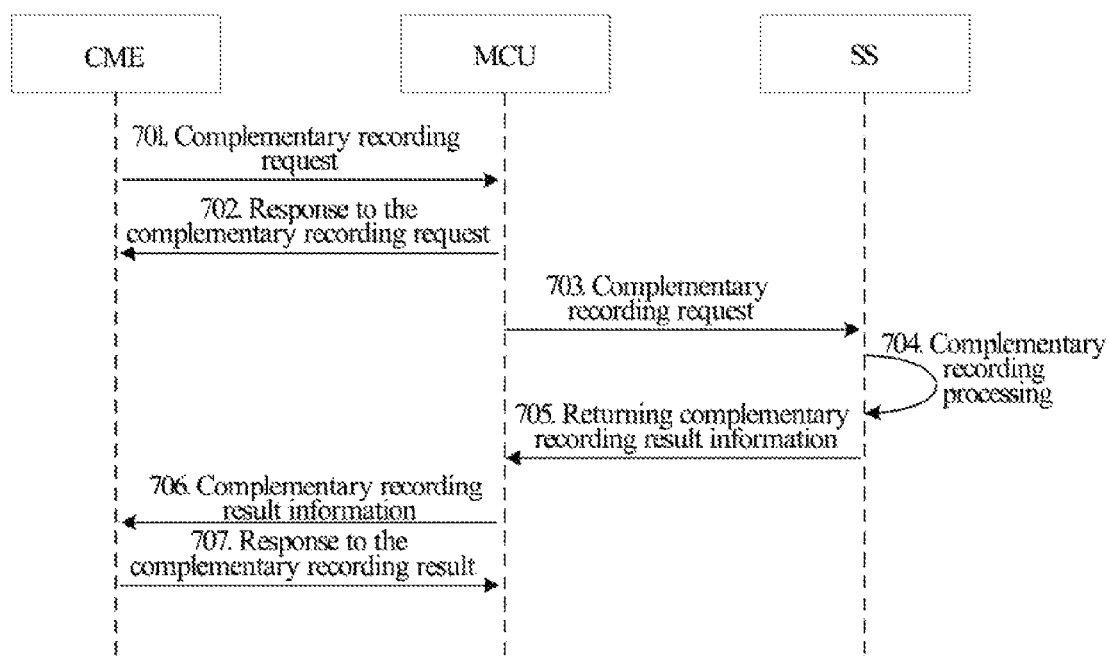
FIG. 7 is a flowchart of a procedure of performing complementary recording of TVOD in an IPTV system according to an embodiment of the present invention.

A basic work procedure of complementary recording reconstruction in the embodiment is shown in FIG. 7 and comprises the following steps.

In step 701, a content management engine sends a complementary recording request to a media control unit, while sending a complementary recording task to the media control unit.

In step 702, after receiving the complementary recording request, the media control unit returns a response to the complementary recording request to the content management engine.

In step 703, after assembling complementary task information in the complementary recording request, the media control unit sends the complementary recording request and complementary recording task to a streaming server of an IPTV system.

In step 704, after receiving the complementary request for the TVOD, the streaming server determines whether there is a recorded program required to be recorded complementally in the locally stored recording content of TSTV; and if yes, duplicates the recorded program and creates a TVOD file.

If there is no segment of program required to be recorded complementally in the recorded content of the TSTV, the complementary recording is failed.

In step 705, after performing the complementary recording request for the TVOD, the streaming server sends complementary recording result information to the media control unit to return the execution result of the complementary recording task.

In step 706, after receiving the complementary response, the media control unit sends the complementary recording result information to the content management engine to report the execution result of the complementary recording task.

In the above two steps, the execution result may be that the complementary recording is successful, or the complementary recording is failed. If the complementary recording is successful, the execution result includes file path information and identifier information (for example, file name) of the TVOD file, and may also include other attribute information of the TVOD file, such as size, name, etc.

In step 707, if the complementary recording result information received by the content management engine is complementary recording success information, the content management engine sends a response to the complementary recording result to the media control unit to confirm that the complementary recording result message has been successfully processed, and then the content management engine marks the task of recording the TVOD in a complementary recording status as a success state; if the complementary recording result information received by the content management engine is complementary recording failure information, the content management engine marks the task of recording the TVOD in a complementary recording status as a failure state.

Thereafter, the content management engine checks periodically the failed tasks of recording the TVOD and determines whether to perform a TVOD mutual reconstruction method.

In the recording method according to the embodiment of the present invention, the recording of the program may be failed in some of the nodes for a certain reason, while the recording of the program is successful in the other nodes so as to realize inter-node automatic mutual reconstruction of the recorded program.

Before and after the process in which a core module—the content management engine—of the IPTV system performs switching between master and backup servers or a server of the content management engine is restarted or upgraded in half an hour and then is started to operate, the current task of recording TVOD is almost not influenced and reaches a very high success rate of recording.

After the process in which a media control unit of each node of the IPTV system performs switching between master and backup servers or the server of the media control unit is restarted or upgraded in a long time and is started to operate, a streaming server to which the media control unit belongs can be prevented from losing the TVOD significantly.

The IPTV system usually has a plurality of streaming servers under control of the media control unit, including a streaming server responsible for coding and decoding of channels. If the streaming server responsible for coding and decoding of the channels does not work, although other streaming servers can be switched to, the switching causes directly the TVOD not to be recorded during the switching. However, the method for recording the program according to the present invention can ensure that the TVOD also exists in other streaming servers under the control of the media control unit, and thus services demanded by users will not be influenced.

In addition, when the record of the TVOD is failed or missed in the IPTV system, the recording of the TVOD may be completed complementarily in an allowable range of the length of time shift of the channel, which is flexible and convenient and greatly improves the performance service of the IPTV system.

The implementation of the method in accordance with the present invention is not limited to the structure of the IPTV system described above, and is also applicable to other system construction. Thus, the method may be applied to content publication of digital TV and recording of TVOD.

The above embodiments are only examples for illustrating the method for recording a program and a multimedia system according to the present invention, and should not be construed as limitations of the present invention. Various possible equivalent variations or replacements may be made based on the description of the technical scheme and the preferred example of the present invention, and all these variations or replacements should belong to the protection scope of the claims of the present invention.

INDUSTRIAL APPLICABILITY

In the recording method according to an embodiment of the present invention, the recording of the program may be failed in some of the nodes for a certain reason, while the recording of the program is successful in the other nodes so as to realize inter-node automatic mutual reconstruction of the recorded program. Before and after the process in which a core module—the content management engine—of the IPTV system performs switching between master and backup servers or a server of the content management engine is restarted or upgraded in half an hour and then is started to operate, the current task of recording TVOD is almost not influenced and reaches a very high success rate of recording. After the process in which a media control unit of each node of the IPTV system performs switching between master and backup servers or the server of the media control unit is restarted or upgraded in a long time and is started to operate, a streaming server to which the media control unit belongs can be prevented from losing the TVOD significantly. When the record of the TVOD is failed or missed in the IPTV system, the recording of the TVOD may be completed complementarily in an allowable range of the length of time shift of the channel, which is flexible and convenient and greatly improves the performance service of the IPTV system.

What is claimed is:

1. A method for recording a program, applied to a multimedia system of a multi-node architecture comprising a network side device, the method comprising:
   the network side device generating a recording task after receiving a recording request, and sending in advance the recording task to a node in which a channel specified in the recording task is stored;
   the node recording a program on the channel specified in the recording task after receiving the recording task, and returning recording result information to the network side device;
   when the node records the program, the network side device checking periodically the recording result information returned from the node, and sending a scheduling task to a node in which the recording of the program is failed if the recording result information is found to be recording failure information; and
   after receiving the scheduling task, the node in which the recording of the program is failed, as a destination node, scheduling from a node in which the recording of the program is successful, as a source node, the successfully recorded program;
   said destination node determining whether a program which is the same as the scheduled program specified in the scheduling task is stored in the destination node and whether a size of an error of the programs is within an allowable range, and if yes, returning scheduling success information to the network side device.

2. The method according to claim 1, further comprising:
   when the node records the program, the network side device checking periodically the recording result information returned from the node, and checking whether there is a node in which time shift configuration for temporary storage of programs is set for the channel if the recording result information is found to be recording failure information, and if yes, sending a complementary recording task to the node in which the time shift configuration for temporary storage of the programs is set for the channel; and after receiving the complementary recording task, the node in which the time shift configuration for temporary storage of the programs is set for the channel determining whether a time period of the program which is recorded unsuccessfully is within a time range of the programs temporarily stored by the time shift configuration in the node, if yes, extracting a program having the same time period as the time period of the program which is recorded unsuccessfully from the programs temporarily stored in the node as its recorded program, and then returning recording success information to the network side device.

3. The method according to claim 1, wherein the multimedia system is a multilevel node architecture comprising a first level node, second level nodes and third level nodes, the first level node is connected to a plurality of second level nodes, and each second level node is connected to a plurality of third level nodes, the step of the network side device sending the scheduling task to the node in which the recording of the program is failed if the recording result information is found to be the recording failure information comprises:

the network side device firstly determining whether the program is recorded successfully in the first level node in the recording task;

if the program is not recorded successfully in the first level node, selecting a second level node in which the recording of the program is successful as a source node to generate a scheduling task to schedule programs from the first level node, and send the scheduling task to the first level node; if the program is not recorded successfully in the second level node, selecting a third level node in which the recording of the program is successful as a source node to generate a scheduling task to schedule programs from the first level node, and sending the scheduling task to the first level node;

if the program is recorded successfully in the first level node, further determining whether the program is recorded successfully in a second level node in the recording task; if not, selecting the first level node as a source node to generate a scheduling task to schedule programs from the second level node, and sending the scheduling task to the second level node; and if the program is recorded successfully in the second level node in the recording task, determining whether the program is recorded successfully in a third level node in the recording task; if not, selecting a second level node connected to the third level node as a source node to generate a scheduling task to schedule programs from the third level node, and sending the scheduling task to the third level node.

4. The method according to claim 1, wherein after the node receives the recording task, the method further comprises:

the node inserting the received recording task after a recording task in a local recording task queue whose starting time of a time period is earlier than starting time of a time period of the received recording task and has a minimum time interval from the starting time of the time period of the received recording task.

5. A multimedia system comprising a network side device and a plurality of nodes, wherein the network side device is configured to generate a recording task after receiving a recording request, and send in advance the recording task to each node in which a channel specified in the recording task is stored; and the plurality of nodes are configured to record a program on the channel specified in the recording task after receiving the recording task, and return recording result information to the network side device;

the network side device is further configured to, when the node records the program, check periodically the recording result information returned from each node, and send a scheduling task to a node in which the recording of the program is failed if the recording result information is found to be recording failure information; and the node in which the recording of the program is failed, as a destination node, is further configured to, after receiving the scheduling task, schedule from a node in which the recording of the program is successful the successfully recorded program; determine whether a program which is the same as the scheduled program specified in the scheduling task is stored in the destination node and whether a size of an error of the programs is within an allowable range, and if yes, return recording success information to the network side device.

6. The multimedia system according to claim 5, wherein the network side device is further configured to, when each node records the program, check periodically the recording result information returned from the node, and check whether there is a node in which time shift configuration for temporary storage of programs is set for the channel if the recording result information is found to be recording failure information, and if yes, send a complementary recording task to the node in which the time shift configuration for temporary storage of the programs is set for the channel; and the node in which the time shift configuration for temporary storage of the programs is set for the channel is further configured to, after receiving the complementary recording task, determine whether a time period of the program which is recorded unsuccessfully is within a time range of the programs temporarily stored by the time shift configuration in the node, if yes, extract a program having the same time period as the time period of the program which is recorded unsuccessfully from the programs temporarily stored in the node as its recorded program, and then return recording success information to the network side device.

7. The multimedia system according to claim 5, wherein the multimedia system is a multilevel node architecture comprising a first level node, second level nodes and third level nodes, the first level node is connected to a plurality of second level nodes, and each second level node is connected to a plurality of third level nodes, the network side device is configured to, if the recording result information is found to be the recording failure information, send the scheduling task to the node in which the recording of the program is failed by:

firstly determining whether the program is recorded successfully in the first level node in the recording task;

if the program is not recorded successfully in the first level node, selecting a second level node in which the recording of the program is successful as a source node to generate a scheduling task to schedule programs from the first level node, and send the scheduling task to the first level node; if the program is not recorded successfully in the second level node, selecting a third level node in which the recording of the program is successful as a source node to generate a scheduling task to schedule programs from the first level node, and sending the scheduling task to the first level node;

if the program is recorded successfully in the first level node, further determining whether the program is recorded successfully in a second level node in the recording task; if not, selecting the first level node as a source node to generate a scheduling task to schedule programs from the second level node, and sending the scheduling task to the second level node; and if the program is recorded successfully in the second level node in the recording task, determining whether the program is recorded successfully in a third level node in the recording task; if not, selecting a second level node connected to the third level node as a source node to generate a scheduling task to schedule programs from the third level node, and sending the scheduling task to the third level node.

8. The multimedia system according to claim 5, wherein the network side device is a content management engine, and each of the plurality of nodes comprises a media control unit and a plurality of streaming servers controlled by the media control unit;

the media control unit is configured to send the recording task to streaming servers storing the channel specified in the recording task after receiving the recording task sent by the content management engine, and send the recording result information sent from the streaming servers to the content management engine after receiving the recording result information; and streaming servers storing the channel specified in the recording task are configured to record the program on the channel specified in the recording task after receiving the recording task, and return the recording result information to the media control unit.

9. The multimedia system according to claim 8, wherein the media control unit is further configured to send the recording task to a streaming server with a minimum load if there are more than two controlled streaming servers storing the channel specified in the recording task.

\* \* \* \* \*